ANALOG-TO-DIGITAL CONVERSION SYSTEM

Filed Nov. 7, 1963 4 Sheets-Sheet 1

INVENTOR
J. W. PAN
BY Roy M. Porter, Jr.
ATTORNEY

July 5, 1966 J. W. PAN 3,259,896

ANALOG-TO-DIGITAL CONVERSION SYSTEM

Filed Nov. 7, 1963 4 Sheets-Sheet 2

ANALOG-TO-DIGITAL CONVERSION SYSTEM
Filed Nov 7, 1963 4 Sheets-Sheet 3
FIG. 8
| | DIGITS FROM PREVIOUS STAGES | STAGE INPUT | DIGIT OUTPUT | DECODER OUTPUT | ERROR OUTPUT | STAGE OUTPUT |
|---|---|---|---|---|---|---|
| STAGE 1 | – | +.57 | "1" | +.5 | +.07 | +.14 |
| STAGE 2 | "1" | +.14 | "1" | +.5 | -.36 | -.72 |
| | | | "?" | 0 | +.14 | +.28 |
| STAGE 3 | "1 1" | -.72 | "0" | -.5 | -.22 | -.44 |
| | "1 ?" | +.28 | "1" | +.5 | -.22 | -.44 |
| | | | "?" | 0 | +.28 | +.56 |
| STAGE 4 | "1 1 0" | -.44 | "0" | – | – | – |
| | "1 ? 0" | -.44 | "0" | – | – | – |
| | "1 ? ?" | +.56 | "1" | – | – | – |
FIG. 9
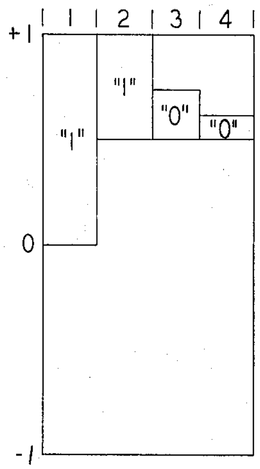
FIG. 10
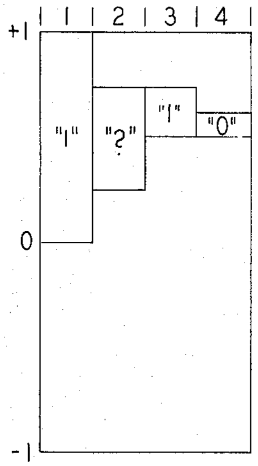
FIG. 11
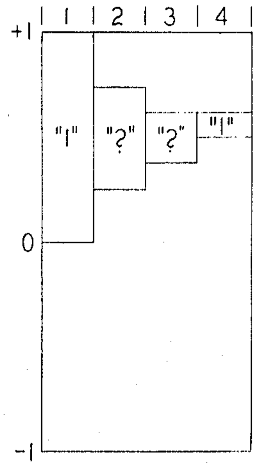

FIG. 12
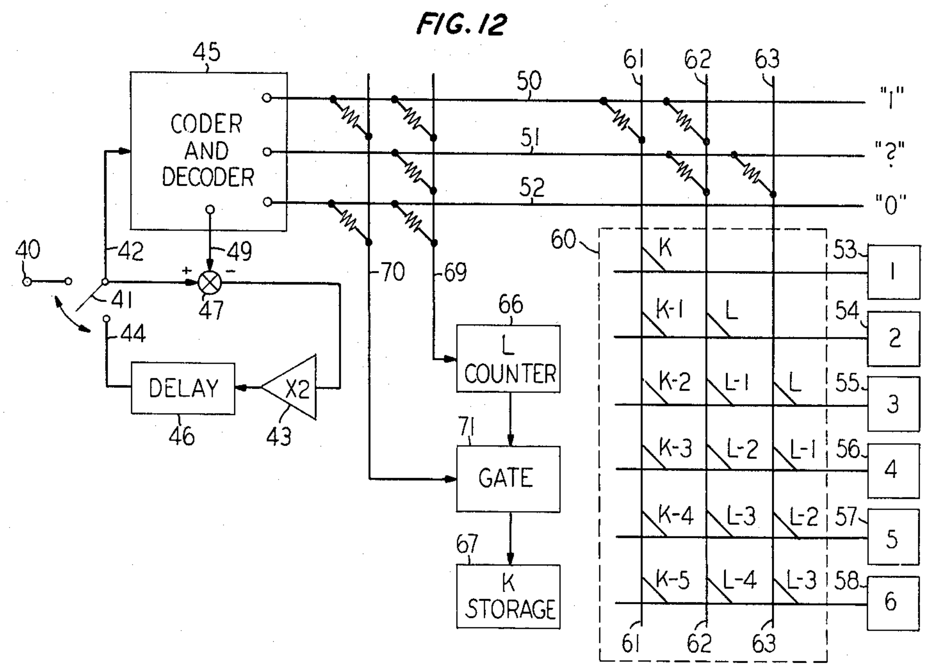
FIG. 13
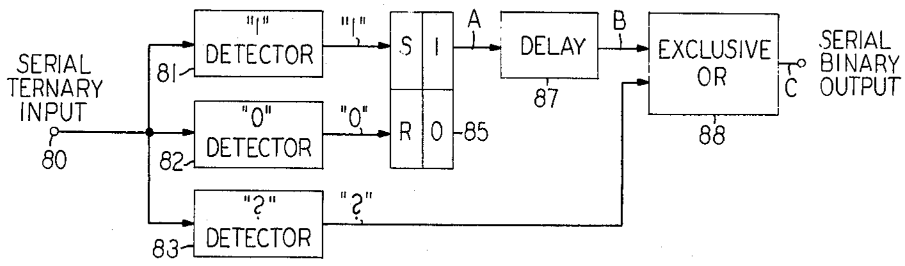
FIG. 14
| INPUT | "1" | "0" | A | B | "2" | C |
|---|---|---|---|---|---|---|
| 0 | – | ⎍ | – | – | – | – |
| 2 | – | – | – | – | ⎍ | 1 |
| 1 | ⎍ | – | ⎍ | – | – | 0 |
| 2 | – | – | ⎍ | ⎍ | ⎍ | 0 |
| 2 | – | – | ⎍ | ⎍ | ⎍ | 0 |
| 1 | ⎍ | – | ⎍ | ⎍ | – | 1 |
| – | – | – | ⎍ | ⎍ | – | 1 |
TIME United States Patent Office 3,259,896

Patented July 5, 1966

3,259,896
ANALOG-TO-DIGITAL CONVERSION SYSTEM

John W. Pan, Plainfield, N.J., assignor to Bell Telephone Laboratories, Incorporated, New York, N.Y., a corporation of New York Filed Nov. 7, 1963, Ser. No. 322,175
5 Claims. (Cl. 340—347)

This invention relates to digital information processing systems and, more particularly, to apparatus for translating an analog quantity such as a voltage into a digital quantity such as a binary code word.

It is a principal object of the present invention to accomplish such analog-to-digital translation at a greatly increased speed without loss of information during the coding process.

The basic coding scheme to which the principles of the present invention are applied has been variously termed "stage-by-stage" coding, "feedback" coding and, perhaps most descriptively, "coding by successive approximation." This approach to analog-to-digital translation was described by B. D. Smith in an article entitled "Coding by Feedback Methods," which appeared in The Proceedings of the I.R.E., volume 41, pp. 1053–8, 1953–8 (1953). The successive approximation coding scheme has proven to be quite useful and has been the subject of extensive study. Systems utilizing this type of coding method are disclosed in the following U.S. patents:

| Number | Name | Issue Date |
|---|---|---|
| 2,516,587 | Peterson | July 25, 1950. |
| 2,660,618 | Aigrain | November 24, 1953. |
| 2,969,535 | Foulkes | January 24, 1961. |
| 3,021,517 | Kaenel | February 13, 1962. |
| 3,035,258 | Chasek | March 15, 1962. |

And in the following U.S. applications:

| Serial No. | Name | Filing Date |
|---|---|---|
| 51,016 | Kaenel | August 22, 1960, now Pat. No. 3,178,700. |
| 206,633 | Waldhauer | July 2, 1962, now Pat. No. 3,187,325. |
| 227,271 | Waldhauer | October 1, 1962, now Pat. No. 3,161,868. |

Successive approximation coders operate by first encoding the analog quantity into a first digital approximation which is then decoded to form an approximate replica of the original analog quantity. Next, an error signal is developed which has an amplitude related to the difference between this first quantized estimate and the actual value of the original analog quantity. This procedure is interated by coding the error signal to form additional digits, decoding these digits, developing a second error signal, and so on. The final digital representation of the analog quantity is then the algebraic sum of the various digital estimates. The scheme may take many different forms by varying the number of digits per approximation, the total number of approximations, and the number of symbols per digit (that is, binary, ternary, etc.).

All encoders necessarily include some reference quantity with which the analog quantity may be compared. Since a coder can be no more accurate than the reference used, it is desirable to remove the burden of accuracy from the active elements; that is, from the amplifiers and decision devices, and place this burden instead on a passive component. In the successive approximation coder, the reference may conveniently take the form of a precision resistance in the feedback-loop decoder. When this is done, the individual coders may be allowed to make substantial errors since the decoder-error generator is capable of producing a signal upon which an accurate correction may be based.

Because the decisions need not be as accurate as before, they may be much more rapidly executed. As an example, signals passing through band-limited circuitry need not "settle" completely before the coding decisions are made. Thus, the successive approximation encoder offers the possibility of faster encoding by relaxing the accuracy requirement placed upon the individual decision devices.

Unfortunately, when decision accuracy is exchanged in favor of increased coding speed, each digit produced becomes less meaningful. If binary symbols are being generated, for instance, the output code contains less than a full bit of information per symbol. Said another way, the uncertainty contributed by the decisions causes the output digits to be weighted in their order of significance by a factor of less than two.

In a principal aspect, the present invention takes the form of an analog-to-digital encoder which exploits the advantages of the speed-accuracy interchange described above in order to increase coding speed while, at the same time, maintaining the full information-carrying capacity of the output code. In accordance with a principal feature of the invention, a pair of not-so-precise decision devices are used to establish two different decision thresholds. These two threshold levels define upper, lower and intermediate signal ranges. Upon making the coding decision, the decision devices generate symbols indicating in which of the three ranges the analog quantity falls. Even though one of the decision devices might wrongly identify an analog quantity having an amplitude near its associated decision threshold, the code generated still has meaning. If a symbol (or symbols) is produced indicating that the analog signal was in the uppermost range, for instance, it is known that the quantity to be encoded has an amplitude which is at least somewhere in the upper half of the range of possible amplitudes. Likewise, if a symbol indicating the lowermost range is generated, the analog quantity is known to be at least somewhere in the lower half of the overall range. Accordingly, when either the uppermost or lowermost ranges are indicated, the most significant digit of the Gray (reflected binary) code may be generated. When the intermediate range is indicated, the most significant digit is still uncertain, but the second most significant digit may be produced. In this instance, determination of the first digit is delayed until the range of possible amplitudes is magnified during the course of succeeding approximations. In accordance with still another feature of the invention, novel digital translation circuits are employed for converting the three-state code produced by the decision devices into either conventional binary or Gray code, each having full information-carrying capacity.

In order to obtain a more complete understanding of these and other objects, features and advantages of the present invention, consideration should be given to the following detailed description and the attached drawings. FIGS. 1 through 4 of the drawings illustrate the basic successive approximation coding arrangement while the remaining FIGS. 5 through 10 relate to the novel coding scheme contemplated by the present invention. More specifically, FIG. 1 depicts in block-diagram form a "digit-at-a-time" successive approximation coder;

FIG. 2 graphically illustrates the reflected binary representation of signal amplitudes achieved by the encoder of FIG. 1;

FIG. 8 is a chart listing the various signal levels which might appear within a four stage coder using the transfer characteristics illustrated in FIGS. 5 and 6;

FIGS. 9 through 11 illustrate the manner in which the three possible ternary code words developed as shown in FIG. 8 may be interpreted to represent the same subrange or quantile;

FIG. 12 illustrates a successive approximation coder embodying the principles of the present invention;

FIG. 13 shows a translation circuit for converting the three-level code from the primary coder stages into a serial, conventional binary output; and FIG. 14 illustrates the message states appearing at various points in the circuit of FIG. 12 during the course of the translation processes.

Figure 1:
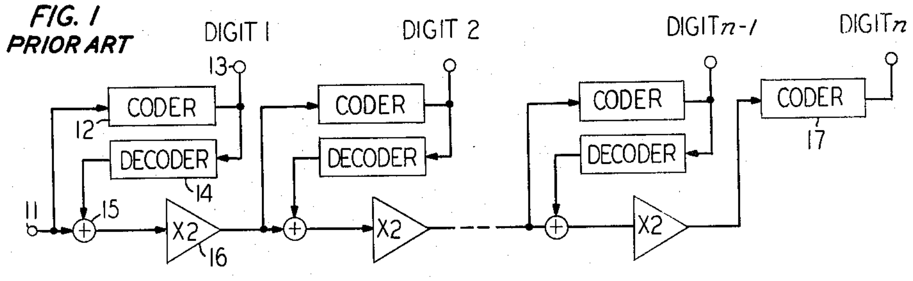
FIG. 1 PRIOR ART

FIG. 1 of the drawings shows the typical layout of an *n*-digit, successive approximation coder made up of *n* coding stages connected in tandem. Each of these stages is provided with an analog signal input connection, an error signal output connection, and a digit signal output connection. The error signal output from the first stage is connected to supply the analog signal input to the second stage, and so on. The *n* output digits appear in parallel at the digit outputs of the several stages.

As can be seen from FIG. 1, all of the stages (except the last) are essentially identical. The analog signal to be encoded is applied to the analog input terminal 11 of the first stage. The input signal applied to terminal 11 is then also applied to the input of a 1-digit coder 12 which develops a digit symbol (either a "0" or a "1") indicative of the amplitude range in which the input signal lies. This digit symbol appears at terminal 13 and constitutes the most significant digit of the binary word to be generated. The single digit decoder 14 forms an analog estimate of the input signal's amplitude based on the symbol generated by coder 12. This estimate is then applied to one input of the summing node 15. The actual value of the signal to be encoded is also applied to the summing node 15 and the difference between the actual value and the decoded estimate is applied to the input of a "times-two" amplifier 16. The output from amplifier 16 then forms the input to the second digit coding stage. Each of the remaining coding stages operates in an identical manner to the first. The number of total stages used is dependent upon the total number of digits required for the output word. Since it is not necessary for the last stage to develop an error signal upon which successive digits may be based, only the coder 17 is needed.

The principles of the present invention may be applied to the successive approximation coding scheme illustrated by FIG. 1 of the drawings. In order to obtain a more thorough understanding and appreciation of the present invention, however, it will be helpful to first consider in more detail the conventional technique of successive approximation coding. With this in view, first note FIG. 2 which shows the manner in which the first four digits of the generated Gray code word may be used to uniquely represent that subrange which includes the instantaneous amplitude of the analog input signal. For purposes of illustrating the operation of the coder, it will be assumed that the input signal applied to terminal 11 will always have an amplitude within the range $-1$ to $+1$ volts. To determine the nature of the first four digits of the binary representation of any quantized subrange between $+1$ and $-1$, simply find the analog message amplitude on the scale at the left and then sight across the diagram from left to right reading off the four digits. Thus, the first four digits of the conventional reflected binary representation of the subrange which includes amplitude $+.57$ is seen to be the digits "1010" as illustrated by the broken line in FIG. 2.

Figure 2:
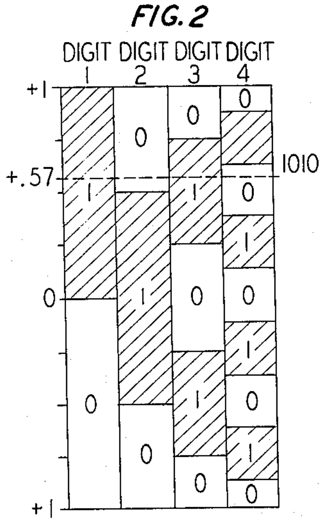
Figures 3, 4:
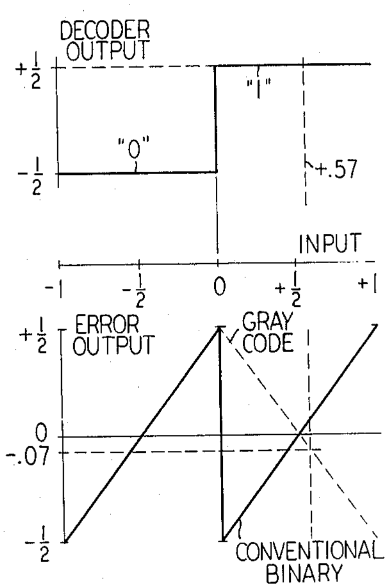
FIG. 3 PRIOR ART, FIG. 4 PRIOR ART
FIG. 3 shows the digit output transfer characteristic of the coders as shown in FIG. 1.
FIG. 4 shows the error output transfer characteristic for the coder-decoder combination as shown in FIG. 1.

It may be noted from FIG. 2 that any input signal amplitude applied to terminal 11 which has an amplitude greater than zero results in the first stage coder 12 generating the digit "1" and applying this digit to terminal 13. The decoder 14 shown in FIG. 1 then forms an estimate of the input signal amplitude based on this first digit. The decoder output characteristic plotted with respect to input signal amplitude is shown in FIG. 3 of the drawings. As can be seen, whenever the signal input is less than zero, a binary "zero" appears at terminals 13 and decoder 14 applies the first estimate in the form of a biasing signal having an amplitude $-\frac{1}{2}$ to the summing node 15. In contrast, when the input signal is greater than zero, a binary "1" appears at the digit output terminal 13 and a decoder delivers a biasing signal of $+\frac{1}{2}$ to the summing node 15.

The relationship between the amplitude of the difference signal from summing node 15 and the amplitude of the input message signal is shown in FIG. 4 of the drawings. Note that two different transfer curves are used for positive input signals, depending upon whether conventional binary or reflected-binary (Gray) code outputs are desired. For purposes of illustration, the Gray code transfer characteristic shown as a broken line in FIG. 4 will be assumed. As an alternative to inverting the difference signal when the digit generated is a "1," one may choose instead to use the conventional binary transfer characteristic and to invert the next digit. Either scheme results in the code assignments as shown in FIG. 2.

The summing node 15 as shown in FIG. 1 develops a signal having an amplitude equal to the difference between the biasing signal from the decoder 14 and the actual value of the analog signal applied to the input terminal 11. Thus, with an input signal of the previous example, $+.57$, the coder 12 generates a binary "1" and the decoder delivers a biasing signal of $+\frac{1}{2}$ to the summing node 15 as shown in FIG. 3. When the value of the biasing signal is subtracted from the actual value of the analog signal, a difference signal of $-.07$ is developed and applied to the input of the amplifier 16 as shown in FIG. 4. Amplifier 16 multiplies this difference signal times two to deliver a signal value of $-.14$ to the second stage, causing it to generate a "0" as the second digit. Note that amplifier 16, since it multiples this error output signal by two, allows each succeeding stage to be identical. The operation outlined above is repeated by the succeeding stages to produce an output code in which the first four digits are "1010."

The conventional successive approximation coding scheme described above is quite straightforward in the sense that only a single decision is made per stage, that is, the decision of whether or not the input signal to a particular stage is greater than or less than the zero threshold level. For any realizable decision device, however, when the input signal level is near the threshold level the decision may be wrongly made. Indeed, for physical devices, when the difference between the input signal and the threshold level is less than an arbitrarily small quantity, the result of the decision can be stated only in probabilistic terms. This means that a signal may be slightly positive and still yield a binary "0," and vice versa. In addition, the decision devices and the amplifiers that supply signals to the decision devices have a limiting speed. Consequently, if an attempt is made to make coding decisions before signals passing through these band-limited circuits have settled to final values, additional inaccuracies are introduced. As will be appreciated, a compromise must be made between the speed at which coding is accomplished and the uncertainty created by the resulting inaccuracies. In making this compromise, it must be remembered that decision inaccuracies cause the digits generated to be less meaningful. As an example, if perfect decisions could be made (and if the input signal is just as likely to be positive as it is to be negative), a full bit of information would be conveyed by the most significant of the binary digits generated. As the range of possible mistakes surrounding the threshold level increases, however, the symbol generated contains progressively less information.

In a principle aspect, the present invention takes the form of a coding arrangement allowing the burden of accuracy to be susbtantially removed from the individual decision devices while, at the same time, generating an output code wherein the digits produced have full information carrying capacity. In the embodiment of the invention shown in FIG. 7, the basic, successive approximation coding configuration illustrated in FIG. 1 of the drawings is used, the principal difference being that the coders and decoders employed have transfer characteristics like those shown in FIGS. 5 and 6 of the drawings. In each coding stage according to this embodiment of the invention, two threshold levels instead of one are used to define upper, lower and intermediate signal subranges. The coder then generates a ternary symbol "1," "0" or "?" indicating that subrange in which the input signal amplitude lies. As will be seen, the series of ternary symbols thus generated may then be translated into a full capacity binary code word.

Figure 7:
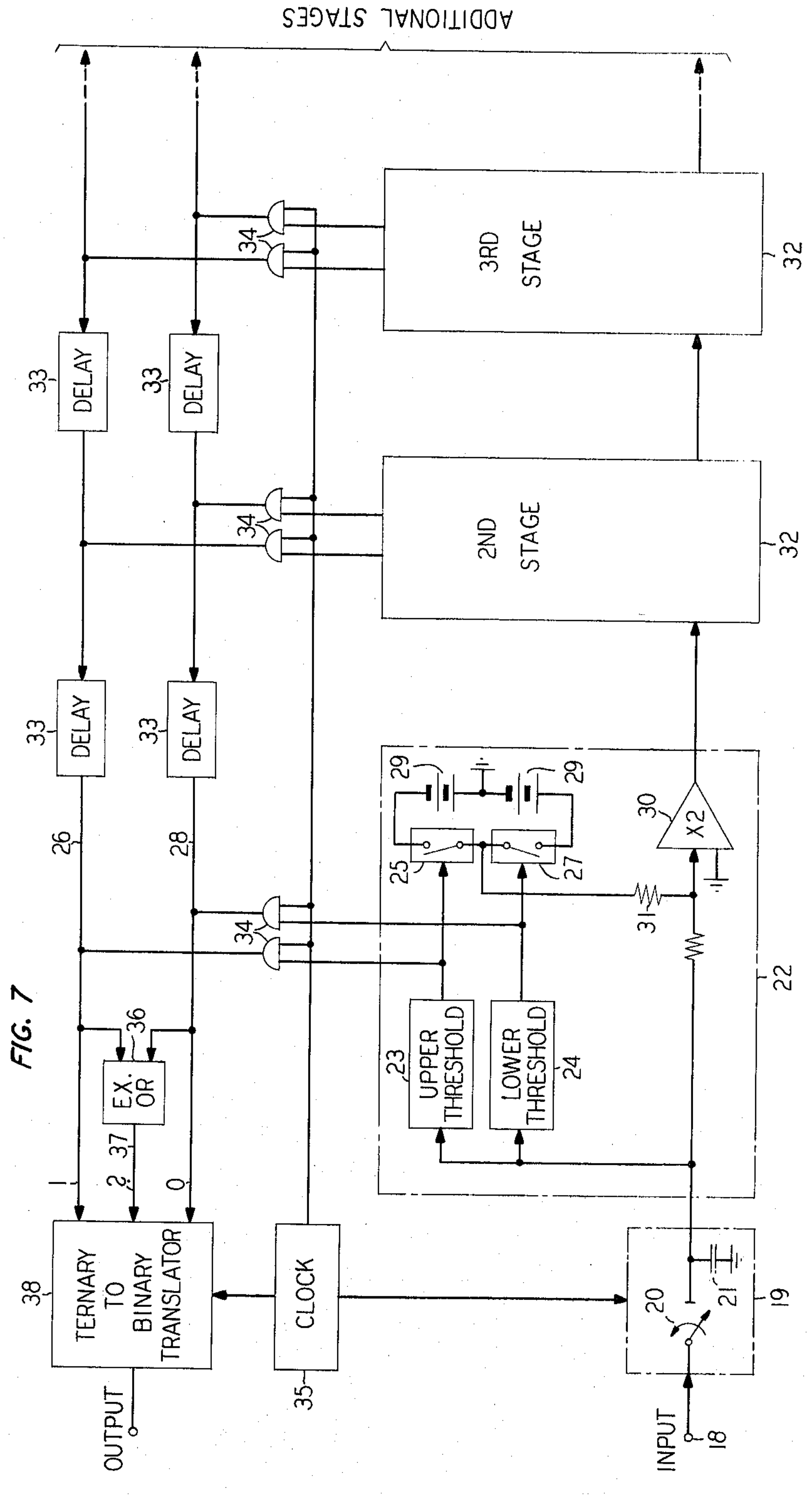
FIG. 7 illustrates a tandem coder embodying the principles of the present invention.

FIG. 7 of the drawings shows a tandem coder capable of generating a binary output code in accordance with the principles of the invention. The input signal to be encoded is applied to terminal 18, the input terminal of the "sample and hold" circuit 19. The switch 20 within the sample and hold circuit 19 rotates at the sampling rate. During the period of brief closure, the potential across the holding capacitor 21 very rapidly assumes and then follows the input signal voltage. When the switch 20 opens, the latest state of charge (which is essentially an instantaneous sample) is left on capacitor 21 until the next closure.

Figures 5, 6:
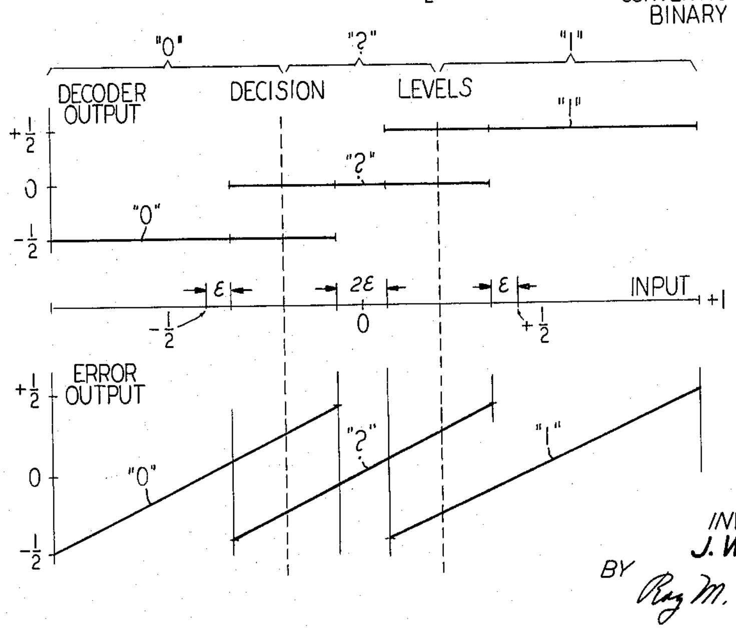
FIG. 5 depicts the decoder output transfer characteristic achieved by one embodiment of the present invention.
FIG. 6 shows the error output transfer characteristic achieved by an encoding stage according to the present invention.

The pulse amplitude modulated signal from circuit 19 is then fed to the first coding stage 22. Stage 22 includes a pair of threshold circuits 23 and 24, each of which is connected to receive the P.A.M. signal from sample and hold circuit 19. The upper threshold circuit 23 delivers an output signal which closes switch 25 and energizes conductor 26 whenever the input sample is greater than the upper decision level. The lower threshold circuit 24 closes switch 27 and energizes conductor 28 whenever the input sample is less than the lower decision level. The closure of switches 25 or 27 supplies a negative or positive biasing signal respectively from the batteries 29 to the input of a times-two amplifier 30. This biasing signal is supplied through a precision resistance 31. Note that for highly positive signals, a negative biasing signal is added to the sample signal (rather than a positive biasing signal being substracted as shown in FIG. 5). Each of the remaining coding stages 32 are identical to the stage 22 (except the last—which needs no biasing signal generator). Each of these stages develops the transfer characteristic shown in FIG. 6.

The digial signals from the coding stages are applied simultaneously to a sequence of delay units 33 by AND gates 34 which are actuated by clock source 35. The digital signals then pass from left to right through the sequence of delay units 33 to appear on conductors 26 and 28 in succession, most significant digit first. The delay units 33 may, of course, comprise stages of a shift register which is shifted at the desired output pulse repetition rate.

When conductor 26 is energized, the digit "1" is applied to the translator 38. When conductor 28 is energized, the symbol applied is a "0." When neither 26 nor 28 are energized the EXCLUSIVE-OR gate 36 energizes conductor 37 to indicate a "?." The three digit conductors 26, 28 and 37 thus deliver the ternary information to translator 38 which converts the information into a more conventional binary code. A detailed description of two translators adapted to perform the desired ternary to binary conversion will be discussed below with regard to FIGS. 12 and 13. Although the circuit shown in FIG. 7 may be instrumented through the use of a variety of well-known amplifiers, decision devices and pulse-actuated gates and switches, typical devices which are particularly adapted to high-speed coding are disclosed on pages 1 through 266 of the Bell System Technical Journal, volume XLI, Number 1, January 1962.

The vertical broken lines passing through the graphs of FIGS. 5 and 6 show the relative position of the two decision levels developed within the coding stage. As an example, these decision levels may be placed at $+1/4$ and $-1/4$. The coder attempts to distinguish between the upper, lower and intermediate subranges which are separated by the threshold levels. Whenever the input signal has an amplitude greater than the $+1/4$ threshold, a "1" should be generated. When the input signal amplitude lies in the intermediate range; that is, between $+1/4$ and $-1/4$ thresholds, the "?" symbol should be produced. When the signal is less than $-1/4$, a ternary "0" would be generated in the ideal case. Realizing that the requirement for perfectly accurate decisions limits the coding speed, allowance is made for possible inaccuracies near either decision level by placing less reliance on the ternary symbol produced. The invention relaxes the accuracy requirements for each decision device such that it becomes permissible to generate either of two possible symbols when the input signal aplitude is near either decision level. The possibility of generating either of two symbols by the not-so-precise decision devices is shown by the overlapping lines in FIGS. 5 and 6. Thus, it will be noted that for signals between $+\underline{e}$ and $(1/2-\underline{e})$, either a "1" or a "?" may be generated. Note, however, that a "1" will never be generated for a negative signal even though the individual decisions may be inaccurate. Similarly, no positive signal could cause the generation of a "0." If a "?" is generated, the signal is not known to be either positive or negative, but it is certain to be somewhere between $-1/2+\underline{e}$ and $+1/2-\underline{e}$. As will be appreciated, the quantity $\underline{e}$ may be as large as $+1/4$ or as small as zero without altering the operation of this embodiment of the invention.

FIG. 6 of the drawings graphically represents the relationship between the amplitude of the input signal and the amplitude of the error signal delivered to the input of the "times-two" amplifier. As an example, suppose the input signal has a value of $+1/4$ (the same value as that of the upper decision level). In this case, either a "1" or a "?" might be produced. If a "1" is produced, the decoder delivers a biasing signal of $+1/2$, yielding a difference signal of $-1/4$. If the ternary symbol "?" is generated, a biasing signal having a zero value is delivered to the summing node and the difference signal is then merely the original signal value of $+1/4$. Accordingly, the signal delivered to the next coding stage has an amplitude in this case of either $-1/2$ or $+1/2$.

By comparing the Gray code assignments shown in FIG. 2 with the ternary coding stage characteristics plotted in FIGS. 5 and 6, the following statements can be made. If the most significant ternary symbol generated is a "1," the input signal must be greater than zero and hence the most significant binary symbol must be a "1." Likewise, the generation of a "0" by the first ternary coding stage indicates with certainty that the most significant binary digit is also a "0." When the first ternary symbol generated is a "?," the input signal might be either positive or negative. Consequently, the most significant binary digit is still uncertain. The generation of a "?" is not without meaning, however, since the input signal is then known to be at least somewhere in the middle half of the range of possible amplitudes. From FIG. 2, it is then apparent that the second most significant binary digit is certain to be a "1." Determination of the first binary digit is accordingly delayed until the range of possible amplitudes has been magnified during the course of succeeding approximations.

Substantial errors may be made by the decision devices used with the present invention without altering the value of the binary code word generated. As an example, if the analog input amplitude +.57 is applied to a four-stage ternary coder of the type described above, three different ternary code words are possible. These three possibilities are illustrated by the chart of FIG. 8 which lists the various signal levels which might exist within the four-stage coder depending upon the results of the various coding decisions. To prevent ambiguity, the last stage uses only a single decision level and generates only a "1" or a "0" indicating a positive or negative stage input signal respectively. As shown in FIG. 8, the following ternary representations of the +.57 amplitude might be generated: "1100," "1?10" or "1??1."

It may now be shown that each of these ternary code words is representative of the same subrange or quantile. This subrange is identical to that subrange represented by the Gray code word "1010" as shown in FIG. 2. FIGS. 9, 10 and 11 illustrate the manner in which the three possible ternary code words ("1100," "1?10" and "1??1" respectively) may be interpreted. In FIG. 10, for example, the significance of the ternary word "1?10" is apparent. The most significant digit, being a "1," indicates that the signal is somewhere in the upper half of the range of possible amplitudes. The second digit, a "?," signifies that the input signal is in the middle half of the upper half, thus narrowing the range of possible amplitudes to one quarter of the original range. The third digit indicates that the signal is in the upper half of this quarter and narrows the range of possible amplitudes to an eighth. Finally, the last digit, a "0," signifies that the input signal is in the bottom half of the previously designated eighth. By comparing FIGS. 9, 10 and 11, it may be seen that the three different ternary words represent the same subrange or quantile. Thus, all three words are translatable into the Gray code word "1010," the correct Gray code word for indicating the input amplitude +.57 as shown by FIG. 2, even though substantial inaccuracies were permissible in the individual decision elements.

The embodiment of the invention described above offers a considerable speed advantage due to the fact that decisions may be made before the signals existing within the encoder have settled to their final values. As an example, after a decision is made in a given stage and the proper bias inserted at the summing node, the next stage is allowed to make its decision as soon as the signal at the output of the connecting amplifier settles to within 25 percent of its final value. This takes only about 1.4 time constants of the amplifier, in contrast to the much longer relative period required by the conventional successive approximation encoder. The advantage gained by relaxing the accuracy requirements on the decision elements is even more pronounced when a larger number of digits is generated. This results, of course, from the fact that in the prior coders no decision can be made until the signal from the preceding stage has almost completely settled.

FIG. 12 of the drawings illustrates still another embodiment of the invention wherein the analog quantities circulate successively through a single stage coder/decoder combination. The output digits are delivered in succession, most significant digit first. The basic scheme of the "recirculating" successive approximation encoder is described in U.S. Patent 2,969,535, which issued to J. D. Foulkes on January 24, 1961. In accordance with the present invention, however, the arrangement shown in FIG. 12 employs a dual threshold coder having characteristics like those shown in FIGS. 5 and 6, rather than the single threshold coding stage as previously used.

In the embodiment of the invention shown in FIG. 12, the analog signal to be encoded is applied to the input terminal 40. The switch 41 normally connects conductors 42 and 44 but is adapted for momentarily disconnecting conductor 42 from conductor 44 and connecting it instead to input terminal 40. This action of switch 41 applies a short duration sample of the analog input voltage to the input of a coder/decoder 45 and to one input of summing node 47. The coder/decoder 45 energizes one of the digit output conductors 50, 51 or 52 depending upon whether the sample voltage existing on conductor 42 is in an upper, intermediate, or lower subrange, respectively. The coder/decoder 45 also develops an estimate of the input amplitude which appears as a biasing signal on conductor 49. The relationship between the amplitude of the input signal and the amplitude of the biasing signal is shown in FIG. 5 of the drawings. An error signal representative of the difference between the analog input signal and the biasing signal estimate appears at the output of the summing node 47 and is applied to the input of the "times-two" amplifier 43. Amplifier 43 magnifies the error signal and applies it back to the input of the coding stage through delay unit 46. The coding stage accordingly continues to make successively finer grained approximations of the input signal to deliver the desired number of ternary digits to the symbol conductors 50, 51 and 52.

The embodiment of the invention shown in FIG. 12 also includes apparatus for translating the ternary digits appearing on conductors 50, 51 and 52 into the desired output Gray code. The code translation scheme shown in FIG. 12 employs conventional logic components including six binary counters 53 through 58. These counters store the first six digits of the output Gray code. Pulses to set and reset these counters are fed from the conductors 50, 51 and 52 through three bus conductors 61, 62 and 63 and a gate matrix 60. The gate matrix 60 is controlled by a pair of counters 66 and 67. Conductors intersecting within the matrix 60 are connected only when the function associated with that intersection is zero. For example, when both counters 66 and 67 are initially set at zero ($L=0$, $K=0$), then bus 61 is connected to the input of the first digit counter 53, bus 62 is connected to the input of the second digit counter 54, and bus 63 is connected to the input of the digit counter 55.

The "L" counter 66 advances one count with each output digit since its input conductor 69 is connected to each of the symbol conductors 50, 51 and 52. The conductor 70, which is connected to the symbol conductors 50 and 52, is energized whenever a "1" or a "0" is generated by the coder/decoder 45. When conductor 70 is energized, gate 71 is closed to set the "K" storage counter 67 equal to "L."

The translating apparatus shown in FIG. 12 converts the ternary code appearing at the output of the coder/decoder 45 into an output Gray code. For example, assume the input sample amplitude was equal to +.57 and the coder/decoder 45 generated the ternary word "1?10." Since both counters 66 and 67 are initially set at zero and conductor 50 is the first to be energized, a "1" is stored in the two output counters 53 and 54. Conductors 69 and 70 are also energized, advancing both "L" counter 66 and "K" counter 67. The next symbol being a "?," conductors 62 and 63 are energized to store a "1" the third and fourth output counters 55 and 56. At this time, each of the first four output counters is storing a "1," all other output counters being set at "0." The "?" symbol also advances "L" counter 66 to a two count while "K" counter 67 remains at a one count. The third ternary digit, a "1," energizes conductors 50 and hence conductors 61 and 62. Since $(K-1)=0$, the second digit output counter 54 is again pulsed and changes back to its zero state. The state of output counter 56 is also inverted back to a zero since $(L-2)=0$. Also, counter 66 advances to a three count and gate 71 is closed, also setting the "K" storage counter 67 to a three count. The last digit being a "0," no pulses are fed to the gate matrix 60 but the counters 66 and 67 are again advanced. Thus, the first four digits of the output Gray code are correctly "1010." The number of output and input digits may, of course, be extended to any desired number. In FIG. 12, provision is made for up to six output Gray code digits. The translator shown in FIG. 12 may be used as the translator 38 shown in FIG. 7 in which case the digits appearing on conductors 26, 37 and 28 would be applied to the conductors 50, 51 and 52 respectively of the translator.

If desired, conventional binary output digits may be easily generated from the Gray code developed as shown in FIG. 12. Alternatively, conventional diode logic may be used to translate the ternary digits which appear in parallel from the tandem coding stages shown in FIG. 7. The Boolean function for such a translation is given below where P, Z and N denote positive "1," zero "?" and negative "0" decisions, respectively, and the subscript indicates the digit position. Thus, the first conventional binary digit is represented by the Boolean function:

$$B_1=P_1+Z_1P_2+Z_1Z_2P_3+ \ldots +Z_1Z_2Z_3 \ldots\ldots Z_nP_{n+1}$$

And the second digit:

$$B_2=\overline{Z}_1P_2+\overline{Z}_1Z_2P_3+\overline{Z}_1Z_2Z_3P_4+ \ldots\ldots +\overline{Z}_1Z_2Z_3Z_4 \ldots Z_nP_{n+1}+Z_1N_2+Z_1Z_2N_3 +Z_1Z_2Z_3N_4+ \ldots\ldots +Z_1Z_2Z_3Z_4 \ldots Z_nN_{n+1}$$

where $\overline{Z}_1$ means "not $Z_1$," the Boolean equivalent of $(P_1+N_1)$. The Boolean translations function may, of course, be generalized to all the binary digits.

Translation by diode logic as outlined above may require a prohibitive number of diodes. As an alternative, the serial translation scheme shown in FIG. 13 may be used to convert directly from the ternary code generated in accordance with the invention into conventional binary code. In the arrangement shown in FIG. 13, the digits are processed backward, least significant digit first.

Some insight into the operation of the translation apparatus shown in FIG. 13 may be gained from a review of the ternary coding process. First, a comparison of FIGS. 4 and 6 indicates that unless a ternary "?" is generated, the encoder according to the present invention operates exactly the same as does a conventional successive approximation encoder which uses the solid line transfer characteristic of FIG. 4. Thus, if no "?" is generated, the ternary code is identical to the conventional binary representation of the input signal and no translation is necessary.

Suppose, however, that the input signal to one of the stages was only slightly positive (less than +¼), its magnitude being $+\underline{x}$. This stage, which will be called stage $\underline{i}$, might therefore deliver either a "?" or a "1" as an output digit, in which case the input signal to stage $(\underline{i}+1)$ would be $+2\underline{x}$ or $-(1-2\underline{x})$, respectively. Stage $(\underline{i}+1)$ might then generate a "1" if the previous digit was a "?" and a "0" if the preceding digit was a "1." In either case, the input to the stage $(\underline{i}+2)$ will be the quantity $(4\underline{x}-1)$. In general, it can be shown that the input signal to the second stage following a stage which generates a single "?" (or the last "?" in a series) would have been the same even if the decision in the previous stage had been something other than a question mark. Said another way, as long as the last digit in a series of ternary digits is not a "?," the residue signal applied to the input of the next stage will always have the same magnitude even though the previous series itself may be composed of several possible combinations of symbols. A further example of this fact may be obtained from FIG. 7 from which it may be noted that the input to the fourth stage had the value −.44 in the case where the previous stages generated a "110" and in the case where the first three digits were "1?1."

From the foregoing analysis, it may be concluded that unless a given ternary digit or the digit preceding it in the series is a "?" that digit is translated unaltered to obtain the appropriate corresponding conventional binary digit. Thus, the ternary digits developed in the example depicted by FIG. 10, namely, "1100," are also the correct conventional binary digits. Further, the first and last digits in the ternary series "1?10" are translated without changing the symbol since, in each case, neither, the digit in question nor the one preceding it is a "?."

From FIG. 6, it may be sene that if a "?" is followed by a "1" or a "0," then the second symbol should be substituted for the "?." The second digit should then be inverted, a "1" replacing a "0" and vice versa, since the ±½ biasing signal which should have been introduced would have reversed the polarity of the difference signal produced by the stage generating the "?."

Consequently, when the digits are processed backwards, least significant digit first, the following operations will produce the appropriate conventional binary code word. Whenever a ternary digit is not zero, it should remain unchanged unless the next (more significant) digit is a "?," in which case it is inverted. When the digit is a "?" it takes on the value of the preceding (less significant) digit. In the case of a series of "?'s" in the ternary code, the "preceding digit" mentioned above may itself be a substituted value. Thus, in the example depicted in FIG. 10 where the ternary code word was "1??1," the last digit is processed first and is inverted to obtain a least significant digit in the binary code which is a "0." This is done since the next digit to be processed is a "?." This "?" takes on the trial value of the first processed digit, viz. "1." Because the third digit to be processed is also a "?," however, the trial value is again inverted to become a "0" and the second most significant digit takes on the original "1" trial value of first "?" processed. The most significant digit is unaltered so that the final translated code word is "1100."

FIG. 13 of the drawings shows apparatus for implementing the translation process described above. The ternary digits to be translated are applied in series and in reversed order to the input terminal 80. Signals applied to input terminal 80*e* and in turn applied to the inputs of the three symbol detectors 81, 82 and 83. The output of "1" detector 81 is energized whenever the current digit applied to terminal 80 is a "1" and sets the flip-flop 85 to energize conductor A. A "0" on terminal 80 activates detector 82 which resets flip-flop 85 and de-energizes conductor A. Signals on conductor A are delayed by a single digit period by the delay line 87 and are applied by way of conductor B to one input of the EXCLUSIVE-OR gate 88. "?" digits which appear on terminal 80 activate the "?" detector 83 and energize the other input to gate 88. The desired conventional binary code word then appears in series, also least significant digit first, on the output conductor C.

In operation, the detectors 81 through 83 control the flow of the signal. As long as no "?" appears at the input terminal 80, propagation of each digit is straight-forward without inversion or substitution. A "?" digit causes the inversion of the previously applied digit and retains the original value of that digit for itself. FIG. 14 of the drawings gives an illustrative example of the operation of the translator shown in FIG. 13. The word shown there which is to be translated is "1??1?0" which is applied last digit first. Pulses are shown on the chart of FIG. 14, whenever the associated conductor is energized. Thus, at the time the second "?" is applied, conductors A and B as well as the output from the "?" detector 83 are energized, giving a "1" output from the EXCLUSIVE-OR gate 88. Note that the desired output code word "110001" appears least significant digit first and delayed by one digit position from the input code word.

The translator shown in FIG. 13 may be conveniently used in conjunction with a tandem ternary encoder having a configuration of the type pictured in FIG. 7 of the drawings. The parallel output digits from the coders may be applied to a shift register and then shifted from right to left into the translator least significant digit first.

It is to be understood that the above-described arrangements are merely illustrative of the application of the principles of the invention and that other arrangements and processes may be devised by those skilled in the art without departing from the true spirit and scope of the invention.

What is claimed is:

1. In combination, a source of an analog message amplitude, a source of first and second reference amplitudes, a first comparator for generating a first digital signal indicative of whether said message amplitude is greater than, less than or between said first and second reference amplitudes, means responsive to said first digital signal for developing a first approximation of said message amplitude, means for developing an error signal having a magnitude related to the difference between said first approximation and said message amplitude, a source of third and fourth reference amplitudes, a second comparator for generating a second digital signal indicative of whether the amplitude of said error signal is greater than, less than or between said third and fourth reference amplitudes, and a translator for converting said first and second digital signals into a binary permutation code.

2. In combination, a source of an analog message amplitude, a source of first and second reference amplitudes, means for comparing said message amplitude with said first and second reference amplitude, means responsive to said comparing means for generating the most significant digit of a binary permutation code, said most significant digit being a first symbol whenever said message amplitude is greater than both said first and said second reference amplitudes and being a second symbol whenever said message amplitude is less than both said first and said second reference values, and means responsive to said comparing means for inhibiting the generation of said most significant digit whenever said message amplitude is less than said first reference level but greater than said second reference level.

3. Apparatus for translating an analog message signal amplitude into a reflected-binary permutation code which comprises, in combination, means for comparing said amplitude with two different reference levels and for generating a first, a second or a third symbol indicating whether said amplitude is greater than, less than or between said two levels respectively, means for producing the most significant digit of said permutation code in response to the generation of said first or said second digit, and means for producing the second most significant digit in response to the generation of said third symbol.

4. In combination, a source of a message signal, a source of first and second reference signals, means for generating a first ternary digit indicative of the amplitude of said message signal relative to the amplitudes of said first and second reference signals, means responsive to said first digit for developing a first estimate of the amplitude of said message signal, means for generating an error signal having an amplitude related to the difference between said message signal and said first estimate, a source of third and fourth reference signals, means for generating a second ternary digit indicative of the amplitude of said error signal relative to the amplitudes of said third and fourth reference signals, and a translator for converting said ternary digits into said binary digits representative of the amplitude of said message signal.

5. Decision apparatus for generating a code digit indicative of whether the instantaneous amplitude of an analog signal is greater than or less than a predetermined reference value which comprises, in combination, means for generating a first symbol whenever said amplitude is greater than a first threshold level, means for generating a second symbol whenever said amplitude is less than a second threshold level, said first threshold level being substantially greater than said reference value and said second threshold level being substantially less than said reference value, means responsive to the absence of both said first and said second symbols for amplifying said analog signal, means for generating said first symbol whenever said amplified signal is greater than a third threshold level, and means for generating said second symbol whenever said amplified signal is less than said third threshold value.

No references cited.

DARYL W. COOK, *Acting Primary Examiner.*

K. R. STEVENS, *Assistant Examiner.*